United States Patent [19]
Vinson et al.

[11] Patent Number: 5,768,091
[45] Date of Patent: Jun. 16, 1998

[54] CIRCUIT BREAKER MOUNTING BRACKET

[75] Inventors: Hugh E. Vinson, Hurst; Gary L. Sapp, Plano; Kevin A. Albers, Krum, all of Tex.

[73] Assignee: Lennox Manufacturing Inc., Del.

[21] Appl. No.: 754,557

[22] Filed: Nov. 21, 1996

[51] Int. Cl.⁶ .................................................. H02B 1/00
[52] U.S. Cl. .................. 361/601; 361/627; 361/628; 361/634; 361/673; 361/825; 200/293; 200/294; 200/296
[58] Field of Search .................. 361/627, 628, 361/634, 673, 825, 601; 200/293, 294, 296

[56] References Cited

U.S. PATENT DOCUMENTS 4,351,620  9/1982  Stritt et al. ........................... 403/13

FOREIGN PATENT DOCUMENTS 2694846  2/1994  France ........................... 361/825

Primary Examiner—Leo P. Picard
Assistant Examiner—Boris Chervinsky
Attorney, Agent, or Firm—W. Kirk McCord

[57] ABSTRACT

A circuit breaker mounting bracket is comprised of a generally upright support member, a base member extending generally perpendicularly from a bottom of the support member, a flange depending from a distal end of the base member at an angle less than 90°, and a brace member depending obliquely from the back of the support member. The flange is adapted to be secured to a support surface, such as a deck within an air conditioning or furnace cabinet. The brace member and the flange cooperate to maintain the bracket in a rigid, upright position within the cabinet. The bracket includes a din rail comprising two generally L-shaped flanges integrally formed with the support member, whereby one or more circuit breakers are mountable in a fixed position relative to the bracket. A C-shaped channel is formed on the support member between the L-shaped flanges for receiving two retaining members, which inhibit lateral movement of the circuit breaker(s) mounted on the bracket.

16 Claims, 3 Drawing Sheets

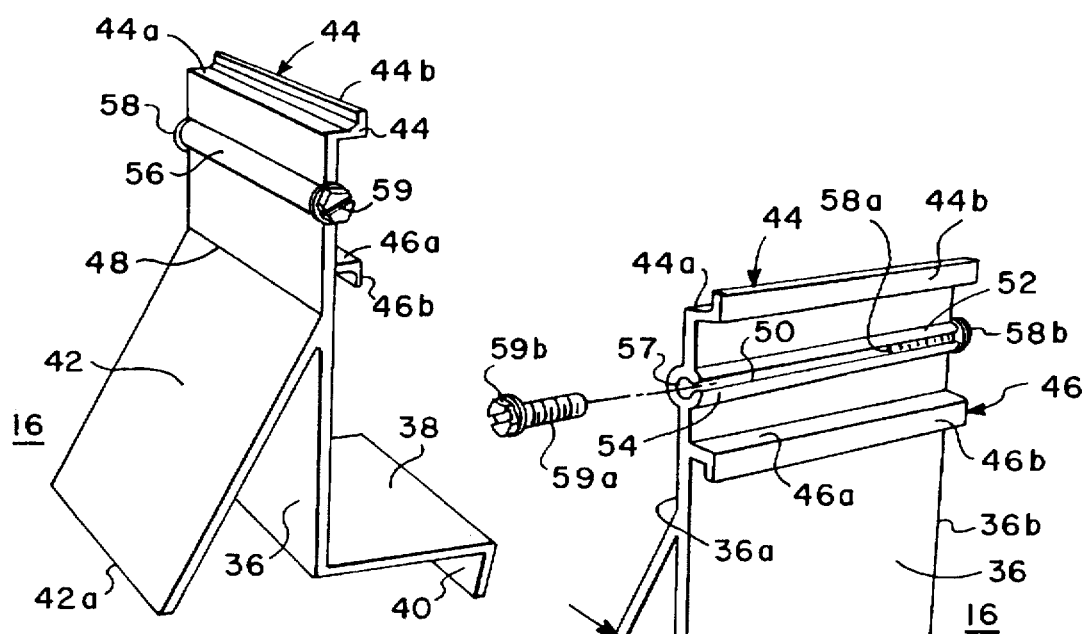
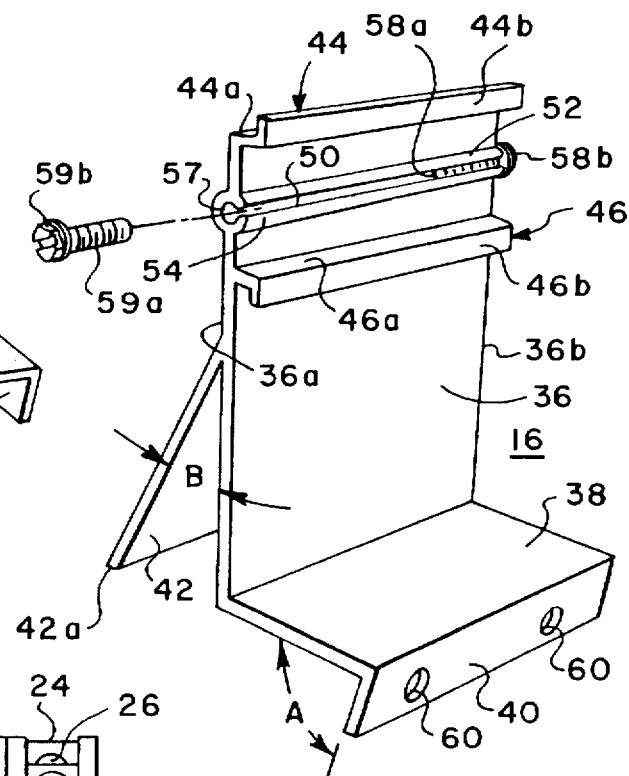
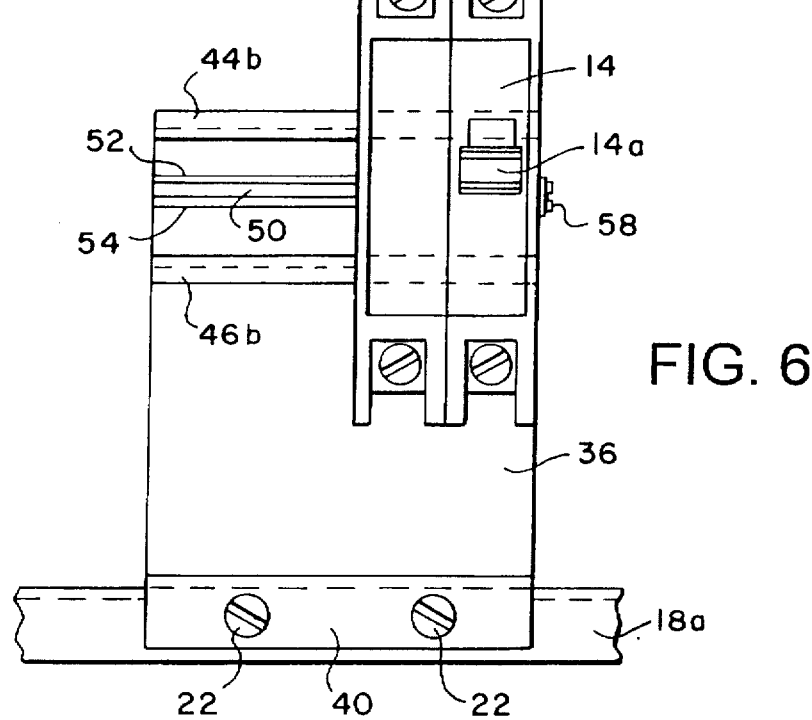
FIG. 4
FIG. 5
FIG. 6

CIRCUIT BREAKER MOUNTING BRACKET

TECHNICAL FIELD

This invention relates generally to circuit breakers used in heating and air conditioning apparatus and in particular to a bracket for mounting circuit breakers of the type used in heating and air conditioning apparatus.

BACKGROUND ART

Air conditioners and heat pumps may include an indoor unit known as a blower coil, which contains a heat exchanger coil, a motor-driven air blower and, in most cases, electrically resistive heating elements housed within a cabinet. One or more circuit breakers are mounted within the cabinet for interrupting the electrical power supply to one or more components of the blower coil. Switches for manually operating the circuit breakers are usually accessible through a window opening in the cabinet. The circuit breakers typically are mounted on a formed metal bracket, which is in turn mounted on a relatively flat deck within the blower coil cabinet. Prior art brackets are generally L-shaped. A din rail (comprised of two L-shaped flanges) or circuit breaker mounting clips are attached by screws or the like to the bracket. The L-shaped flanges of the din rail or the mounting clips, as the case may be, are adapted to engage cutouts on the circuit breakers to mount the circuit breakers with the bracket. Four or more attachment screws or the like are usually required to anchor the bracket in a fixed position within the cabinet.

One problem associated with prior art circuit breaker mounting brackets is that the brackets are fabricated using sheet metal construction, which may result in an excessively large buildup of manufacturing tolerances (e.g., 3/32-inch or more). Because the circuit breaker switches must be accessible through an airtight, close fitting, small window in a service access panel at the front of the cabinet, the relatively large tolerances associated with sheet metal construction may result in the circuit breaker switches not being properly positioned, which may result in air leaks from the cabinet and electrical safety hazards because the circuit breakers cannot be precisely positioned. Another problem associated with such prior art mounting brackets is the difficulty of maintaining the rigidity of the bracket.

There is, therefore, a need for an improved bracket for mounting circuit breakers in air conditioning and heating apparatus. In particular, there is a need for a mounting bracket which can be manufactured with relatively close tolerances and which can be anchored rigidly within the cabinet of an air conditioning and/or heating apparatus.

SUMMARY OF THE INVENTION

In accordance with the present invention, a bracket for mounting one or more circuit breakers is provided. The bracket is comprised of a generally upright support member, a base member extending generally perpendicularly from a bottom part of the support member, a flange depending from a distal end of the base member, a brace member depending obliquely from one side of the support member, and first and second mounting members projecting from an opposite side of the support member from the brace member. The base member is adapted to rest on a fixed support and the flange is attachable to the fixed support, whereby the bracket is mountable therewith. A distal end of the brace member is adapted to rest on the fixed support, whereby the support member is maintained in a rigid, upright position. The first and second mounting members are engageable with the circuit breaker(s), whereby the circuit breaker(s) is supportable by and mountable with the support member.

In accordance with one feature of the invention, the base member and flange define an interior angle of less than 90°.

In accordance with another feature of the invention, the distal end of the brace member is below the base member when the support member is in the generally upright position. The base member is cooperative with the flange, when the flange is attached to a fixed support, to maintain the support member in a rigid, generally upright position.

In accordance with a further feature of the invention, the support member has an elongated channel with opposed first and second open ends. The bracket further includes first and second retaining members extending through the first and second open ends, respectively, to inhibit lateral movement of the circuit breaker(s) relative to the support member.

In accordance with still another feature of the invention, the support member, the first and second mounting members, the base member, the flange, the brace member and the channel are integrally formed as a single piece by extrusion.

The first and second mounting members comprise a din rail for supporting the circuit breaker(s) and retaining the circuit breaker(s) in a fixed position relative to the bracket. In one embodiment, the first and second mounting members are first and second generally L-shaped flanges, respectively, which are matingly engageable with complementary first and second cutouts, respectively, on the housing(s) of the circuit breaker(s), to retain the breaker(s) in a fixed position relative to the bracket. The channel is intermediate the first and second mounting members.

The mounting bracket according to the present invention is fabricated with much closer tolerances than in prior art mounting brackets where sheet metal construction is used. The bracket is formed by extrusion as a single piece, which facilitates assembly thereof. Further, the bracket is more compact than brackets assembled using sheet metal construction, which allows the bracket to be shipped in a smaller container. The bracket maintains itself in a rigid, upright position, which facilitates positioning of the circuit breaker(s) mounted thereon so that the breaker(s) is properly located and readily accessible through a cabinet window. The rigidity of the bracket maintains the circuit breaker(s) mounted thereon in a fixed position.

BRIEF DESCRIPTION OF DRAWINGS

FIG. 4 is a perspective view, showing the back of the bracket;

FIG. 5 is a perspective view, showing the front of the bracket; and

FIG. 6 is a front elevation view of the bracket with one circuit breaker mounted thereon.

BEST MODE FOR CARRYING OUT THE INVENTION

The best mode for carrying out the invention will now be described with reference to the accompanying drawings.

Like parts are marked with the same respective reference numbers throughout the specification and the drawings. The drawings are not necessarily to scale and in some instances proportions may have been exaggerated in order to more clearly depict certain features of the invention.

Figure 1:
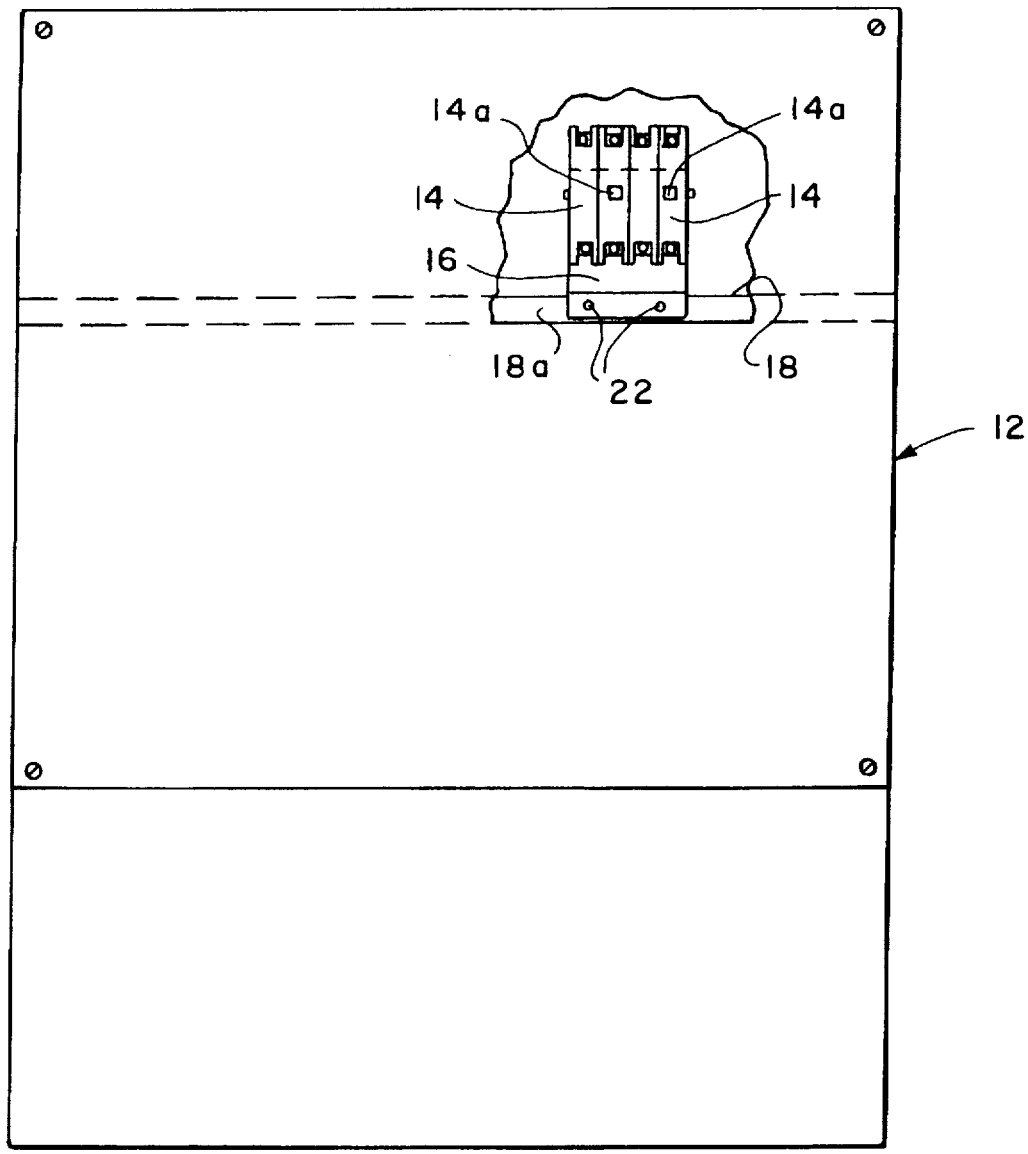
FIG. 1 is a front elevation view of a blower coil cabinet used in an air conditioning and/or heating apparatus, a portion of which is broken away to show a circuit breaker mounting bracket, according to the present invention, with two circuit breakers mounted thereon.

Referring to FIG. 1, a blower coil 10 used as an indoor component of a heating, air conditioning or heat pump system includes a metal (e.g., stainless steel) cabinet 12 housing the major components of the blower coil unit, such as an indoor heat exchanger coil (not shown), a supply air blower (not shown) and one or more electrically resistive heating elements (not shown). FIG. 1 shows two circuit breakers 14 mounted on an extruded aluminum bracket 16, which is secured to a vertically oriented surface 18a of a relatively flat deck 18 within cabinet 12. Bracket 16 is positioned such that manual operable switches 14a of the respective breakers 14 are accessible through a generally rectangular window (not shown) in cabinet 12. The window is sized to accommodate the total number of breakers 14 mounted on bracket 16. Two attachment screws 22 are used to secure bracket 16 to surface 18a.

Referring also to FIGS. 2–6, breaker 14 has a plastic tab 24 with a generally circular opening 26 proximate to the top of tab 24 and a chamfered surface 24a on a bottom part of tab 24. A spring 28 biases tab 24 toward the position shown in FIGS. 2 and 3. Breaker 14 is carried in an insulated housing 30 with rear cutouts 32 and 34.

The structure of bracket 16 will now be described in greater detail with reference to FIGS. 4 and 5, in particular. Bracket 16 is formed as a single piece by extrusion and is comprised of a generally upright support member 36, a base member 38 extending generally perpendicularly from the bottom of support member 36, a mounting flange 40 depending from a distal end of base member 38 such that base member 38 and flange 40 define an interior angle A of less than 90° (e.g., 87°), and a brace member 42 depending obliquely downwardly from the back of support member 36 at an angle B (e.g., 30°). Bracket 16 further includes two generally L-shaped flanges 44, 46 projecting from the front of support member 36. Flange 44 projects from the top of support member 36, while flange 46 is intermediate flange 44 and base member 38 and above a location 48 where brace member 42 emanates from support member 36.

A generally C-shaped channel 50 is formed in support member 36 between flange 44 and flange 46. Channel 50 extends transversely across support member 36 from one edge 36a thereof to an opposite edge 36b thereof. Channel 50 is defined by a downwardly curved lip 52 and an upwardly curved lip 54 on the front of support member 36 and a hump 56 on the back of support member 36. Lips 52, 54 and hump 56 together circumscribe approximately 300° of a full circle.

Channel 50 has a generally C-shaped opening 57 at each end thereof for receiving screws 58, 59, as can be best seen in FIG. 5. Each screw 58, 59 has a threaded shaft portion 58a, 59a and a radially enlarged head portion 58b, 59b. Shaft portions 58a, 59a are inserted through respective openings 57, as shown in FIG. 5, and are rotated clockwise so that the threads on shaft portions 58a, 59a bite into the inner surfaces of lips 52, 54 and hump 56, which define channel 50, to secure screws 58, 59 within channel 50, such that screws 58, 59 are self-tapping. Head portions 58b, 59b limit the penetration of respective screws 58, 59 into channel 50. In FIG. 5, screw 58 is shown fully secured within channel 50, while screw 59 is in the process of being inserted into channel 50.

The thickness of support member 36, base member 38, flange 40 and brace member 42 is approximately 0.080 inch.

Respective horizontal portions 44a, 46a of flanges 44, 46 have a thickness of about 0.060 inch and respective vertical portions 44b, 46b of flanges 44, 46 have a thickness of about 0.040 inch.

Before circuit breaker 14 is mounted with bracket 16, bracket 16 is secured to vertical surface 18a of deck 18 by screws 22, which extend through respective openings 60 in flange 40. Because flange 40 depends from base member 38 at an angle less than 90°, flange 40 is held tightly against surface 18a when screws 22 are tightened, thereby maintaining support member 36 in a relatively rigid, generally upright position. When flange 40 is secured to surface 18a, base member 38 lays flat on top of deck 18.

Figure 2:
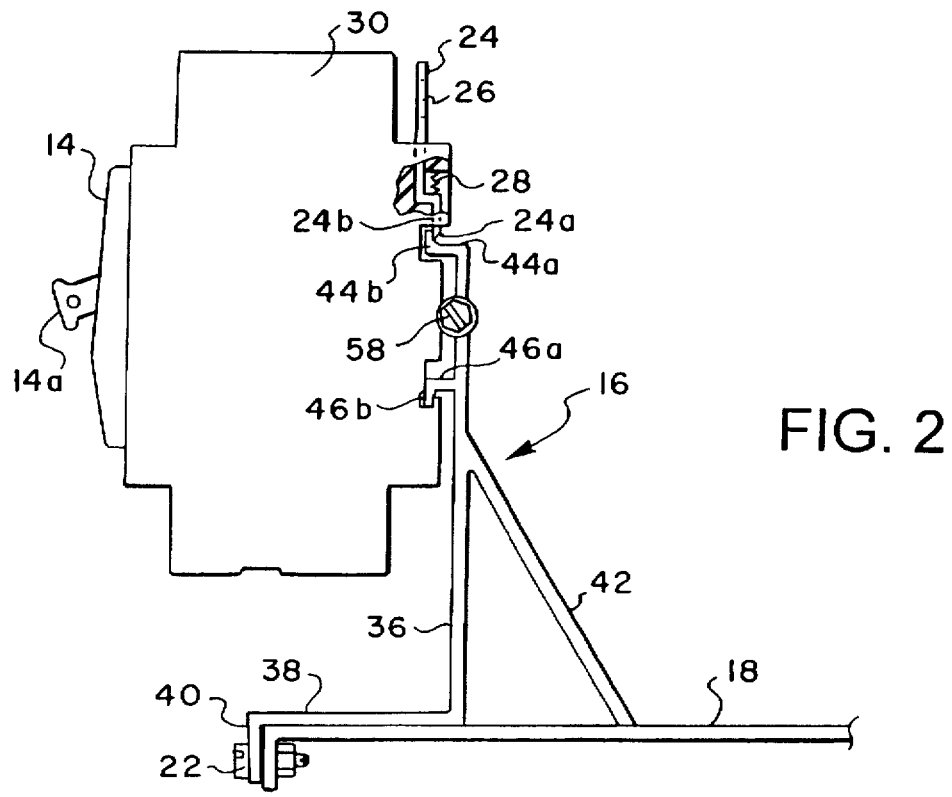
FIG. 2 is a side elevation view of the bracket with a circuit breaker mounted thereon.

Further, a distal end 42a (FIG. 4) of brace member 42 extends below base member 38 so that when flange 40 is secured by screws 22 to surface 18a, a positive force is exerted by brace member 42 against the back of support member 36, thereby urging flange 40 against surface 18a and maintaining support member 36 in the rigid upright position shown in FIG. 2. Bracket 16 is therefore substantially resistant to forces tending to bend or otherwise displace support member 36 from its upright position and base member 38 from its resting position on top of deck 18. By maintaining breaker(s) 14 rigidly mounted with bracket 16 and bracket 16 rigidly secured to deck 18, the corresponding switch(es) 14a is maintained in a fixed position for easy access through the cabinet window.

Figure 3:
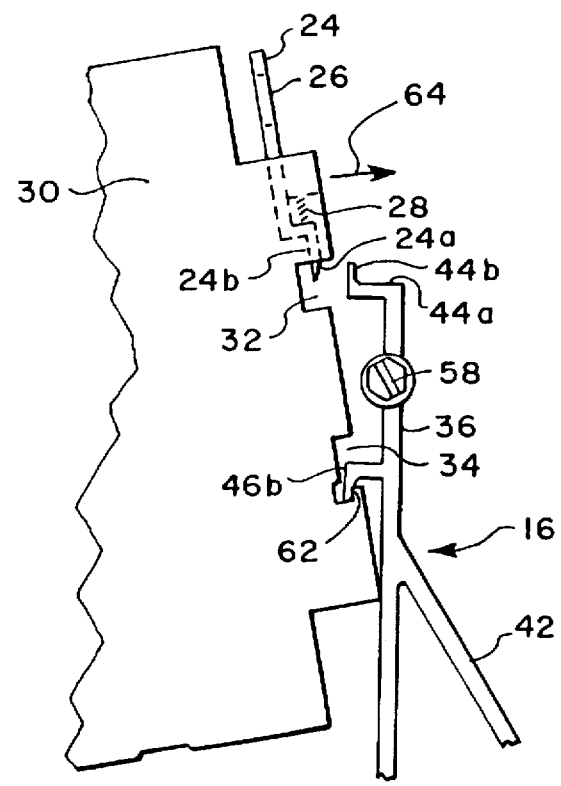
FIG. 3 is a detailed view, illustrating mounting of the circuit breaker with the bracket.

In operation, a circuit breaker 14 is mounted with bracket 16 by positioning lower cutout 34 in mating engagement with flange 46, such that vertical portion 46b engages a shoulder 62 at the back of housing 30, as can be best seen in FIG. 3. With vertical portion 46b so engaged, circuit breaker 14 is rotated in the direction of arrow 64 in FIG. 3 until chamfered surface 24a contacts vertical portion 44b. When chamfered surface 24a contacts a front surface of vertical portion 44b, tab 24 is urged upwardly against the force of spring 28 until the lower portion of tab 24 passes over the top of vertical portion 44b, at which time spring 28 biases tab 24 downwardly, such that a back surface of vertical portion 44b engages a vertically oriented front surface 24b of tab 24, as can be best seen in FIG. 2. Circuit breaker 14 is retained in the position shown in FIG. 2 by engagement between vertical portion 44b and surface 24b and by the engagement of vertical portion 46b with shoulder 62, with the weight of breaker 14 being supported primarily by flange 44. Further, the upwardly extending vertical portion 44b inhibits vertical movement of breaker 14 in a downward direction and the downwardly extending vertical portion 46b inhibits vertical movement of breaker 14 in an upward direction. When screws 58, 59 (FIG. 5) are inserted into channel 50, respective head portions 58b, 59b inhibit lateral movement of breaker 14, such that breaker 14 is retained in a fixed position relative to bracket 16.

To remove breaker 14 from bracket 16, one need only insert a finger through opening 26 and pull upwardly on tab 24 to disengage lower portion 24b from vertical portion 44b and then rotate breaker 14 in an opposite direction from arrow 64 in FIG. 3, such that flange 44 is disengaged from upper cutout 32. After flange 44 has been so disengaged, breaker 14 is lowered to disengage flange 46 from lower cutout 34 and vertical portion 46b from shoulder 62, whereby breaker 14 is demountable from bracket 16.

The extruded aluminum bracket 16 according to the present invention is formed as a single piece bracket, thereby simplifying the fabrication process. Further, only two screws are required to rigidly mount bracket 16 on a support surface such as deck 18. The din rail (comprising flanges 44, 46) is integrally formed with support member 36 so that a separate attachment step is not necessary as in prior art mounting brackets. The extrusion fabrication process yields manufacturing tolerances on the order of 0.005 inch as compared to about 3/32inch tolerances in prior art brackets using sheet metal fabrication. Further, flange 40 and brace member 42 cooperate to maintain the rigidity of bracket 16 so that circuit breaker(s) 14 is held in a fixed position to facilitate access thereto through cabinet window 20. The close manufacturing tolerances of bracket 16 allow precise positioning of breaker(s) 14.

The best mode for carrying out the invention has now been described in detail. Since changes in and modifications to the above-described best mode may be made without departing from the nature, spirit or scope of the invention, the invention is not to be limited to said details, but only by the appended claims and their equivalents.

We claim:

1. A circuit breaker mounting bracket, comprising:
   an upright support member;
   a base member extending perpendicularly from a bottom part of said support member;
   a flange depending from a distal end of said base, said flange being attachable to a fixed support, whereby said bracket is mountable with the fixed support;
   a brace member depending obliquely from one side of said support member, whereby said support member is maintained in an upright position; and
   first and second mounting members projecting from an opposite side of said support member from said brace member, said first and second mounting members being engageable with a circuit breaker, whereby the circuit breaker is supportable by and mountable with said support member.

2. The bracket of claim 1 wherein said support member and said base member define an L-shaped bracket.

3. The bracket of claim 1 wherein said base member and said flange define an interior angle in a range of from 60° to 89°.

4. The bracket of claim 3 wherein said distal end of said brace member is below said base member when said support member is in said upright position, said brace member being cooperative with said flange, when said flange is attached to the fixed support, to maintain said support member in a rigid, upright position.

5. The bracket of claim 1 wherein said support member has an elongated channel extending laterally across said support member and having opposed first and second open ends, said bracket further including first and second retaining members extending through the first and second open ends, respectively, said first and second retaining members being engageable with the circuit breaker to inhibit lateral movement thereof.

6. The bracket of claim 5 wherein said support member has an elongated C-shaped member which defines said channel.

7. The bracket of claim 6 wherein said support member, said first and second mounting members, said base member, said flange, said brace member and said C-shaped member are integrally formed as a single piece.

8. The bracket of claim 1 wherein said support member, said first and second mounting members, said base member, said flange and said brace member are integrally formed as a single piece.

9. The bracket of claim 1 wherein said first mounting member is matingly engageable with a complementary first cutout on a circuit breaker housing and said second mounting member is matingly engageable with a complementary second cutout on the circuit breaker housing, said first and second mounting members being vertically spaced apart when said support member is in said upright position and being cooperative to retain the circuit breaker in a fixed position relative to said bracket.

10. The bracket of claim 9 wherein said first mounting member extends from a top part of said support member and said second mounting member is below said first mounting member.

11. The bracket of claim 10 wherein said support member has elongated channel extending laterally across said support member and having opposed first and second open ends, said bracket further including first and second retaining members extending through the first and second open ends, respectively, said first and second retaining members being engageable with respective opposed sides of a circuit breaker mounted with said bracket to inhibit lateral movement of the circuit breaker, said channel being located between said first and second mounting members.

12. The bracket of claim 1 wherein said first and second mounting members are each L-shaped.

13. The bracket of claim 1 further including retaining means engageable with the circuit breaker to inhibit lateral movement thereof.

14. A mounting bracket, comprising:
    an upright support member;
    a base member extending perpendicularly from a bottom part of said support member;
    a flange depending from a distal end of said base member;
    a brace member depending obliquely from one side of said support member, a distal end of said brace member being below said base member when said support member is in an upright position;
    L-shaped first and second projections on an opposite side of said support member from said brace member, said first and second projections being vertically spaced apart when said support member is in said upright position;
    an elongated C-shaped channel extending laterally across said support member on said one side of said support member between said first and second projections, said channel having opposed first and second open ends; and
    first and second retaining members extending into said channel through said first and second open ends, respectively.

15. The bracket of claim 14 wherein said first and second retaining members are respective first and second screws, each of said first and second screws having a threaded shaft portion and a head portion radially enlarged with respect to the shaft portion thereof.

16. The bracket of claim 15 wherein said support member, said base member, said flange, said brace member, said first and second projections and said channel are integrally formed as a single piece bracket.

* * * * *